United States Patent [19]

Davis

[11] Patent Number: 5,043,007

[45] Date of Patent: Aug. 27, 1991

[54] PROCESS FOR THE PRODUCTION OF FERTILIZER AND THE FERTILIZER PRODUCED THEREBY

[76] Inventor: Bobby G. Davis, 884 W. Port Dr., Rockledge, Fla. 32955

[21] Appl. No.: 467,331

[22] Filed: Jan. 19, 1990

Related U.S. Application Data

[63] Continuation of Ser. No. 236,320, Aug. 25, 1988, abandoned, which is a continuation of Ser. No. 124,361, Nov. 23, 1987, abandoned, which is a continuation of Ser. No. 867,594, May 27, 1986, abandoned, which is a continuation of Ser. No. 506,860, Jun. 22, 1983, abandoned.

[51] Int. Cl.$^5$ .................... A01N 59/00; A01N 43/08
[52] U.S. Cl. ............................................ 71/80; 81/81; 81/82; 81/83; 81/84; 81/28; 81/31; 81/64.06; 81/DIG. 1
[58] Field of Search ............ 71/28, 31, 64.06, DIG. 1, 71/89, 80, 81, 82, 84, 83

[56] References Cited

U.S. PATENT DOCUMENTS

| | | | |
|---|---|---|---|
| 1,966,947 | 7/1934 | Gyer et al. | 71/60 |
| 3,031,290 | 4/1962 | Senoir et al. | 71/2.4 |
| 3,617,239 | 11/1971 | Klanica | 71/28 |
| 3,867,124 | 2/1975 | Church | 71/28 |
| 4,026,696 | 5/1977 | Young | 71/28 |
| 4,525,198 | 6/1985 | Van Hijfte et al. | 71/28 |

*Primary Examiner*—C. Warren Ivy
*Assistant Examiner*—Raymond Covington
*Attorney, Agent, or Firm*—Arthur G. Yeager

[57] ABSTRACT

A method for forming a binder-free granular or semi-granular fertilizer is disclosed, which comprises mixing a seed material and primary and secondary nutrient sources in a blender under heat until a slurry is formed, transferring the slurry to a long dryer, and drying the product under vacuum and thereafter gradually cooling the product to produce a granular or semi-granular fertilizer with a core of a seed material and a coating of secondary nutrient salts crystallized thereabout, with nutrients and biologically active agents entrained therein. The fertilizer formed has excellent stability and may be urea-free.

14 Claims, No Drawings

PROCESS FOR THE PRODUCTION OF FERTILIZER AND THE FERTILIZER PRODUCED THEREBY

This is a continuation of copending application Ser. No. 07/236,320 filed on Aug. 25, 1988, now abandoned, which was a continuation of Ser. No. 07/124,361 filed Nov. 23, 1987, now abandoned which was a continuation of Ser. No. 06/867,594 filed on May 27, 1986, now abandoned, which was a continuation of Ser. No. 06/506,860 filed on Jun. 22, 1983, now abandoned.

BACKGROUND OF THE INVENTION

1. Field of the Invention

This invention relates to a process for the production of fertilizers provided with biologically active agents and the fertilizers produced thereby. More specifically, a process is provided by which a granular or semi-granular fertilizer can be formed which may further incorporate various organic agents, particularly in a folial fertilizer form.

2. Description of the Prior Art

It has long been the practice to artificially enrich the nutrients available to crops to enhance and accelerate their yield by application of fertilizer to the crops, particularly to the ground or water supply for the crops. Similarly, fertilizers are commonly used to improve the growth of plants desired for their aesthetic characteristics. Recently, industry attempts have focused on the provision of a fertilizer which is applied to and absorbed through the leaves of the plants, or a folial fertilizer, as a more efficient, and in the long run, less expensive method of fertilizing. Such folial fertilizing methods also lend themselves to the introduction or incorporation of biologically active agents, particularly growth regulators to further stimulate growth. As a result, those of skill in the industry have also focused on developing means to provide a fertilizer including such agents in a granular or semi-granular form. Unfortunetly, such attempts have met with numerous problems.

Among the most important of the problems encountered is the difficulty in providing a fertilizer with all the necessary nutrients in a form useful, particularly as a folial fertilizer. The formation of granular, or semi-granular fertilizers, which can be discretely dispensed with the aid of water, has long been sought, but rarely achieved. Frequently, attempts to provide such fertilizers have resulted in products which quickly separate and lose their integrity or are non-uniform to begin with.

Further problems encountered in the effort to provide granular, folial fertilizers is the difficulty in binding the nutrient to the core of the granule. Although traditionally a binder in the nature of a wax or oil is employed, as described in U.S. Pat. Nos. 3,295,950 and 3,580,715, these are unsuitable for folial fertilizers, as leaf absorption requires the fertilizer components to be water soluble.

One alternative is described in U.S. Pat. No. 3,867,124, which employs a urea-ferrous sulphate complex as a binder for the nutrients about core prill. However, urea is a highly concentrated nitrogen source, and application of urea in a folial fertilizer may cause nitrogen burning, or phytotoxicity.

Another problem encountered in the provision of biologically active agents is that many of these agents are denatured or "killed" at relatively low temperatures, particularly those agents which are, or based on, complicated protein structures. As many of the prior art attempts to form granular fertilizers, with or without biologically active agents, have employed relatively high heats, above 200° F., these processes cannot be used to form a fertilizer incorporating a biologically active agent of this type.

Accordingly, there persists an industry-wide need to provide a granular or semi-granular fertilizer, particularly a folial fertilizer prepared without a binder, which may further incorporate one or more biologically active agents.

SUMMARY OF THE INVENTION

It is accordingly one object of this invention to provide a process whereby granular or a semi-granular fertilizer may be made, which fertilizer retains its integrity over an extended shelf life.

It is another object of this invention to provide a binder-free folial fertilizer which is absorbed by the plant relatively quickly.

It is yet another object of this invention to provide a granular or semi-granular fertilizer which incorporates biologically active agents.

These and other objects of the invention can be achieved through use of the process and fertilizer disclosed hereinbelow.

A granular or semi-granular fertilizer (granular. as used, is intended to refer to a particulate substance, substantially all of the particles passing through a mesh of size 8-20, while semi-granular is intended to mean a particulate substance wherein substantially all of the particles pass through a mesh size 20 or greater) may be made by mixing a seed material and conventional nutrients in a blender, preferably a jacketed ribbon blender. Secondary or micronutrients, such as iron, magnesium, manganese, copper, boron, zinc and molybdenum are also added. Either the hydrates of these micronutrients are selected so as to provide sufficient waters of hydration to form a slurry in the blender, or an additional water source is added to achieve the same effect. A biologically active agent is added at this initial step. Blending is continued, with heating, until a slurry is formed, whereupon the mixture is transferred to a holding tank, or in a continuous process, a dryer.

The mixture is transferred to a dryer provided with mechanical agitators which act to move the mixture through the dryer. Heat is applied in the dryer, preferably under a vacuum, but the dryer is of sufficient dimension to provide a pathway long enough to allow the mixture to cool and recrystallize in an unheated portion of the dryer. The product that exits from the dryer is a granular or semi-granular fertilizer, comprised of a seed material, provided with a nutrient and micronutrient-containing coating, the coating further containing one or more biologically active agents.

This invention may be further understood by reference to the detailed description provided below.

DETAILED DESCRIPTION OF THE PREFERRED EMBODIMENTS

The granular or semi-granular fertilizer of this invention may be prepared by mixing a seed material, generally in the form of prills, together with conventional nutrients and, if desired, one or more biologically active agents, with the micronutrient waters of hydration or alternative water source sufficient to form a slurry, in a first blender, maintaining the blender at a temperature of about 115° F.–140° F., and mixing until a slurry is formed. A particularly preferred temperature is 128° F. To ensure good maintenance of an even temperature, a jacketed ribbon blender is preferred as the blending device. Although the time required to form a slurry will vary with the load, on a commercial scale, this mixing will take approximately 15–20 minutes.

After slurry formation, the mixture is transferred to a holding tank, if a batch process is being employed. Thereafter, or, in a continuous process, directly, the load is transferred to a dryer provided with mechanical agitators, and is preferably maintained under a vacuum.

The dryer employed in this process must be relatively long as compared with its diameter (a minimum ratio is approximately 5:1) and is preferably provided with a tube surrounded by a cylindrical shell, the shell being suitable for receiving steam or other heated substance in the space between the shell and the tube of the dryer, into which tube the slurry mixture is introduced. A vacuum, or near vacuum, approximately 15 inches to 20 inches of mercury, is preferably applied to the dryer interior. The mechanical agitators of the dryer are preferably a plurality of small, vari-pitched paddles, or similar device suitable for moving the mixture along the dryer length. A particularly suitable jacketed vacuum dryer is marketed by Strong-Scott Company of Minneapolis, Minn., under the name Solidaire Dryer.

As the load is introduced to the dryer indirect heat is applied through the jacket by conduction of a heated gas or liquid into the aforementioned cylindrical shell, such that the temperature of the inner wall of the shell is maintained at approximately 140°–150° F. No heat is applied to the last half of the dryer, and the product is allowed to cool as it travels the length of the dryer, solidifying and exiting as a granular or semi-granular product, at about 90° F. To assist in directing the flow of vapors and fertilizers in the dryer, as well as enhance heat transfer, a small amount of sweep gas, e.g., nitrogen, may be introduced to the dryer.

The fertilizer produced by this process is comprised of a seed material coated with nutrients and micronutrients and optionally one or more biologically active agents. Exemplary seed materials include potassium nitrate, ammonium nitrate, urea, calcium nitrate, sodium nitrate potassium sulfate and ammonium sulfate, generally in the form of prills. The seed material should be selected so as to meet the desired size restrictions (i.e., granular or semi-granular).

The seed material is coated with a coating containing nutrients and secondary micronutrients. As exemplary nutrients, one or more of phorphous, potassium and urea may be included in the mixture. It is important to note that, in contrast to prior art systems, urea need not be present for the formation of a coating about the prill, and is included optionally, only as a nutrient. If urea is either not desired or is supplied by an alternative source, the fertilizer may omit urea. The fertilizer may also include a buffer, which may be urea or carbamate.

Also included in the coating are secondary or micronutrients, which are familiar to those of ordinary skill in the art. Among these micronutrients are iron, magnesium, manganese, copper, boron (generally added as boric acid), zinc and molybdenum. The micronutrients are generally added to the fertilizer mixture as hydrated salts of the micronutrient, e.g., hydrated sulfates. One or more of the micronutrients must be included in order to form the coating. Thus, the fertilizer of this invention is essentially "binder free, in that no binder need be employed to form the nutrient coating. Although Applicant does not wish to be bound by this explanation, it appears that the micronutrient salt is dissolved in the slurry. As the mixture is dried, the salt(s) recrystallize about the seed material, and, assuming sufficient mixing or mechanical agitation, in uniform amounts. Other nutrients present are entrained in this recrystallization coating. Thus, the fertilizer of this invention may be characterized as "binder-free" in that no binder need be employed to form the nutrient coating. For this reason, if the micronutrient is not introduced as a hydrated salt sufficient to provide enough waters of crystallization to form a slurry, an alternate source of water, such as addition of $H_2O$ directly to the mixture, must be provided.

As noted, because of the low temperatures employed in the process for manufacturing this fertilizer, the fertilizer may optionally include biologically active agents incorporated in the coating. Although a wide number of agents, particularly growth regulators, are known to those of skill in the art, and generally any agent which is not denatured at temperatures below about 150° and is otherwise uneffected by the mixture can be employed, particularly preferred growth regulators include $GA_3$ (gibberellic acid), NAA (1-naphthalene acetic acid), CCC (chloroethyl choline chloride), kinetin, ABA (abscisic acid), DMSO (dimethylsulfoxide) and BAP (benzylaminopurine).

Although the composition of the fertilizer, and the raw mixture prior to drying, will vary depending on the nature of the seed material used, nutrients and micronutrients selected, and biologically active agent employed, if any, general ranges can be identified for the important nutrients, particularly on an elemental basis. Nitrogen should be present in amounts of 0–36% on an elemental basis. Potassium should be present in amounts of 2–4%, particularly for folial fertilizers, as potassium appears to be critical in the process by which the fertilizer is absorbed by the plant. In folial fertilizers, phosphorus should be present in trace amounts, whereas, in ground fertilizers, phosphorous should be present in amounts of from 0–15%. Generally, in ground fertilizers, nitrogen will be present, at a maximum, of about 30%.

If urea is to be used, it should be present in amounts of 1–4%.

The micronutrients employed will be present in varying amounts, as determined by the needs of the plant to be fertilized, the ground condition, etc. One of ordinary skill in the art will recognize and be aware of the varying needs, and adjust the formulations accordingly. Generally, micronutrients, as the elemental metal, are present in amounts varying from about 0.01%–3%. In particular, iron, on an elemental basis, should be present in amounts of from 0.75–1.5%; manganese from 1.5–3%; and copper, boron, zinc and magnesium from 0.011–1.0%, molybdenum 0.002 max. all on an elemental basis.

The biologically active agents are generally present in extremely small quantities, as is well known in the art. See, e.g., Economic Botany, Vol. 12, No. 3, July–September 1958, pages 213–255, as to the extremely small quantities of gibberellic acid having substantial growth effects. Generally, the biologically active agents of this invention should be present in the fertilizer mix at between $10^{-4}$–$10^{-6}$ M SOL.

As an illustrative example not intended to limit the invention, the following composition has been prepared according to the above-disclosed process and used with good results.

| Fertilizer Component | Amount Present On Elemental Basis |
|---|---|
| Nitrogen (As Potassium Nitrate Prills) | 1% |
| Iron (As Ferrous Sulphate) | 1% |
| Manganese (As Manganese Sulphate) | 2% |
| Copper (As Cupric Sulphate) | 0.08% |
| Boron (As Boric Acid) | 0.02% |
| Zinc (As Zinc Sulphate) | 0.05% |
| GA₃ | 0.003% |

A fertilizer prepared according to the above-described process may be conveniently applied to the ground or the leaves of the plant to be fertilized by spraying, using water as a carrier. Of course, the amount of water required per acre will vary with the equipment used per application, including the type of nozzle employed, the discharge rate of the nozzle and the speed of the vehicle or person carrying the nozzle. Spray patterns should be uniform and penetrate the upper leave canopy of the plants being fertilized, if a folial fertilizer is employed, to cover the leaves as thoroughly as possible. This may be achieved by using above ground irrigation systems, ground application equipment, backpack sprayers and/or aerial applicators. Although one of ordinary skill in the art may determine, without the exercise of inventive faculty, the amount and frequency of fertilizing necessary, the amount of fertilizer, and frequency of application, for a large number of commercially important crops is provided in Table 1.

TABLE 1

APPLICATION SCHEDULE

| | RATE | APPLICATION TIME |
|---|---|---|
| VEGETABLES COMMERCIALLY PRODUCED | | |
| Beans (Snap, Pole, Lima) | 1.8-2.5 lbs. per acre | 3 Weeks after planting 1 Week before Blossoms appear |
| Beets and Carrots | 1.8-2.5 lbs per acre | 20th-40th-60th Day |
| Broccoli, Cabbage, Cauliflower, Collards, Kale, Lettuce, Mustard, Spinach, Turnips | 1.8-2.5 lbs per acre | 20th-40th-60th Day |
| Sweet Corn | 1.2-2 lbs per acre | 1-2 applications at 12-18-36 inches high |
| Cucumbers, Cantaloupes, Squash, Pumpkin and Watermelon | 1.2-2 lbs per acre | Apply when vines begin to run - 1 Week before Blossoms appear |
| Egg Plant | 1.2-2 lbs per acre | 1 Week before Blossoms appear |
| Herbs, Parsley, Radishes, Rhubarb | .5-1 lb per acre | 20th-40th-60th Day |
| Okra | 1.8-2.5 lbs per acre | 1 Week before Blossoms appear |
| Onions | .5-1 lb per acre | Apply when Onions are about 4 inches high |
| Peas (English, Southern) | 1.2-2 lbs per acre | 1 Week prior to set of Bloom |
| Irish Potatoes | 1.2-2 lbs per acre | 1 Week before Blossom appear |
| Sweet potatoes | 1.2-2 lbs per acre | Apply when Vines begin to run - 1 Week before Blossoms appear |
| Field Potatoes | 1.8-2 lbs per acre | 1 Week before Blossoms appear - When first fruits are the size of a quarter - 2-3 Weeks later if desired |
| Trellished Tomatoes (Staked) | 1.2-2 lbs per acre | 1 Week before Blossoms appear - When first fruits are the size of a quarter - 2-3 applications When production is extended over a long period of time |
| Pepper | 1.8-2.5 lbs per acre | 1 Week before Blossoms appear - When first fruits are the size of a quarter - 3 Weeks later if desired |
| FIELD & FORAGE CROPS | | |
| Corn (for, grain Corn and Sorghum Silage | 2.3-5 lbs per acre | 10 Days prior to tassle |
| Cotton | 2-3.5 lbs per acre | 6th Leaf stage - 1st Bloom at Boll set prior to full Boot Stage and Full Head Emergence |
| Grain Sorghum, Sweet Sorghum, Sugar Cane and Sunflower | 2-3.5 lbs per acre | 6th Leaf stage - prior to Bloom & when every new set of Blossoms appear |
| Small Grains (Wheat, Oats, Barley, and Rye) | 2-3.5 lbs per acre | 1 Application in Fall - 1 in Mid-Winter and 1 in Spring |
| Soybeans | 1.8-2.5 lbs per acre | 6 Days prior to set of Bloom |
| Tobacco | 1.8-2.5 lbs per acre | 1 Application 4 weeks after transplanting |
| All Forage Crops | 2-3.5 lbs per acre | 3-4 times per year |
| Peanuts | 1.8-2.5 lbs per acre | 6 days before 1st set of Blossoms and when every new set of Blossoms appears. |

Although this invention has been disclosed above with regard to particular and preferred embodiments, and with specific reference to precise compositions, application times, etc., these are advanced for illustrative purposes only. Variations will occur to those of ordinary skill in the art without the exercise of inventive faculty, which remain within the scope of the invention as claimed hereinbelow.

What is claimed as new and desired to be secured by Letters Patent of the United States is:

1. A process for producing coated fertilizer particles particularly suited for folial fertilizer of plants, said process comprising the following sequential steps:

(a) preparing a mixture of fertilizer pills; one or more plant nutrients selected from the group consisting of potassium yielding compounds, phosphorus yielding compounds and nitrogen yielding compounds; and one or more plant nutrient metallic salts; and sufficient water to form a slurry of the prills, nutrients, and metallic salts in the water;

(b) blending the mixture at a temperature of about 115°-140° F. until the slurry is formed of the mixture;

(c) passing the slurry through an elongated generally cylindrical drying zone having a length:diameter ratio of at least 5:1 wherein the slurry is subjected to a temperature of about 140°-150° F. in passing through generally the first half of the zone, and allowed to cool at ambient temperature while passing through generally the second half of the zone; and (d) recovering a particulate fertilizer consisting essentially of the prills coated with a mixture of the nutrients and the metallic salts.

2. The process of claim 1 wherein the drying zone is maintained at subatmospheric pressure.

3. The process of claim 1 wherein said step (c) includes the passage of a sweep gas through the drying zone.

4. The process of claim 1 wherein said step (b) is conducted at about 128° F.

5. The process of claim 1 further comprising the step of (c) introducing a plant growth regulator into said step (a) prior to said step (b).

6. The process of claim 1 wherein the drying zone of step (c) includes a dryer and applying a vacuum inside the dryer; the dryer having a jacket along the first half of its length and introducing a heated fluid through the jacket of the dryer to maintain the temperature thereof.

7. The process of claim 1 wherein step (c) includes the introduction of a sweep gas into the dryer.

8. The process of claim 1 wherein the prills in step (a) are selected from the group consisting of potassium nitrate, ammonium nitrate, urea, calcium nitrate, sodium nitrate, potassium sulfate and ammonium sulfate.

9. The process of claim 1 wherein the materials in step (a) are free of urea; and said metallic salts are salts of metals selected from the group consisting of iron, magnesium, manganese, copper, zinc, boron and mixtures thereof.

10. A process of claim 1 for making a binder-free granular or semi-granular fertilizer, comprising: a prill material selected from the group consisting of potassium nitrate, ammonium nitrate, urea, calcium nitrate, sodium nitrate, potassium sulfate, and ammonium sulfate in the form of prills having a coating comprised of micronutrients selected from the group consisting of iron, magnesium, manganese, molybdenum, copper, zinc, boron and mixtures thereof.

11. The process of claim 10 wherein said coating includes a growth regulator.

12. The process of claim 10 wherein said growth regulator is selected from the group consisting of gibberellic acid, 1-naphthalene acetic acid, chloroethyl choline chloride, kinetin, abscisic acid, dimethylsulfoxide, benzylaminopurine, and mixtures thereof.

13. The process of claim 10 which is free of urea.

14. The process of claim 13 wherein said seed material is selected from the group consisting of potassium nitrate, ammonium nitrate, calcium nitrate, sodium nitrate, potassium sulfate and ammonium sulfate.

* * * * *